United States Patent
Ehlers et al.

(10) Patent No.: US 8,930,984 B2
(45) Date of Patent: Jan. 6, 2015

(54) METHOD OF CONTENT SUBSTITUTION

(75) Inventors: Enno Lars Ehlers, Hamburg (DE); Mauro Barbieri, Eindhoven (NL); Johannes Weda, Endhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 663 days.

(21) Appl. No.: 12/306,099

(22) PCT Filed: Jun. 28, 2007

(86) PCT No.: PCT/IB2007/052502
§ 371 (c)(1),
(2), (4) Date: Dec. 22, 2008

(87) PCT Pub. No.: WO2008/007279
PCT Pub. Date: Jan. 17, 2008

(65) Prior Publication Data
US 2009/0183198 A1 Jul. 16, 2009

(30) Foreign Application Priority Data
Jul. 4, 2006 (EP) ................................. 06116568

(51) Int. Cl.
*H04N 7/025* (2006.01)
(52) U.S. Cl.
USPC ................ 725/32; 725/33; 725/34; 725/35; 725/36
(58) Field of Classification Search
None
See application file for complete search history.

(56) References Cited

U.S. PATENT DOCUMENTS

| | | | |
|---|---|---|---|
| 5,995,095 A | 11/1999 | Ratakonda | |
| 7,448,059 B1* | 11/2008 | Maetz et al. | 725/50 |
| 7,742,111 B2* | 6/2010 | Shiu et al. | 348/722 |
| 2001/0051516 A1* | 12/2001 | Nakamura et al. | 455/412 |
| 2002/0066106 A1* | 5/2002 | Kanojia et al. | 725/87 |
| 2002/0093591 A1 | 7/2002 | Gong et al. | |
| 2002/0157095 A1 | 10/2002 | Masumitsu et al. | |
| 2002/0176702 A1 | 11/2002 | Frantz | |
| 2002/0194593 A1* | 12/2002 | Tsuchida et al. | 725/32 |

(Continued)

FOREIGN PATENT DOCUMENTS

| | | |
|---|---|---|
| EP | 1361752 A2 | 11/2003 |
| JP | 2000270274 A | 9/2000 |

(Continued)

OTHER PUBLICATIONS

Ziyou Xiong et al: "Highlights Extraction from Sports Video Based on An Audio-Visual Marker Detection Framework" Multimedia and Expo, 2005. ICME 2005. IEEE International Conference on Amsterdam, The Netherlands 06-06 Jul. 2005, Piscataway NJ, USA,IEEE, Jul. 6, 2005 pp. 29-32, XP010843226 ISBN: 0-7803-9332-5.

(Continued)

*Primary Examiner* — Cai Chen

(57) ABSTRACT

A method of substituting a primary content (110) being transmitted on a primary channel (100) with a secondary content (220) corresponding to a content being transmitted on a secondary channel (200), characterized by substituting the secondary content in response to a highlight occurring in the content transmitted on the secondary channel (210-3), said secondary content (220) being a summary of the content already transmitted on the secondary channel. A method as claimed in claim 1, wherein the program being transmitted on the secondary channel (200) corresponds to a live event.

15 Claims, 6 Drawing Sheets

(56) References Cited

U.S. PATENT DOCUMENTS

| | | |
|---|---|---|
| 2002/0194595 A1 | 12/2002 | Miller et al. |
| 2003/0046687 A1* | 3/2003 | Hodges et al. ............... 725/32 |
| 2003/0065657 A1 | 4/2003 | Hashimoto et al. |
| 2004/0017389 A1 | 1/2004 | Pan et al. |
| 2004/0109674 A1 | 6/2004 | Ohmori |
| 2005/0159956 A1 | 7/2005 | Rui et al. |

FOREIGN PATENT DOCUMENTS

| | | | |
|---|---|---|---|
| JP | 2006140913 A | | 6/2006 |
| WO | 9937045 A1 | | 7/1999 |
| WO | 0039707 A1 | | 7/2000 |
| WO | 03030527 A1 | | 4/2003 |
| WO | 03096693 A1 | | 11/2003 |
| WO | 2005001715 A1 | | 1/2005 |
| WO | 2005057931 A2 | | 6/2005 |
| WO | 2006063980 A1 | | 6/2006 |

OTHER PUBLICATIONS

Alan Hanjalic; "Generic Approach to Highlights Extraction From a Sport Video", IEEE International Conf. on Image Processing, ICIP-2003, pp. 1-4, 2003.

Alan Hanjalic; "Multimodal Approach to Measuring Excitement in Video", In International Conf. on Multimedia and Expo. 2003 IEEE, ICME 2003, vol. 2, pp. II-289-II-292.

H. Pan, et al; "Detection of Slow-Motion Replay Segments in Sports Video for Highlights Generation", In International Conf. on Acoustic, Speech, and Singal, Processing vol. 3, pp. 1649-1652, 2001.

Barbieri M. et al; Browsing Video Recordings Using Movie-in-a-Minute, Proc. of the IEEE International Conf. on Consumer Electronics ICCE 2006, pp. 301-302 Jan. 7-11, 2006 Las Vegas, USA.

Taskiran: "Evaluation of Automatic Video Summarization Systems", Proc. SPIE Int. Soc. Opt. Eng. 6073, 6073K 2006.

* cited by examiner

METHOD OF CONTENT SUBSTITUTION

TECHNICAL FIELD

The invention relates to a method of substituting a primary content being transmitted on a primary channel with a secondary content corresponding to a content being transmitted on a secondary channel.

TECHNICAL BACKGROUND

Nowadays TV and radio broadcast offer a multiplicity of programs to be watched or listened to. Availability and affordability of consumer devices capable of receiving video and/or audio broadcasting have increased in recent years. This enables users to be able to watch or listen to their favorite programs when they are on move or at the remote locations. However, while being engaged in watching/listening to a selected program a user does not know that at the same time some important events are taking place. Examples of important event are breaking news or, more prosaic, traffic news.

The patent application RD-346040 discloses an RDS system, in which in one of a program receiving modes traffic messages occur in a program completely differing from the one a receiver is tuned to. This feature can also be extended to news messages audible in a news program receiving mode, in which more or less short news messages, so-called "news flashes", are reproduced at a moment they are broadcasted.

This method merely allows the user to receive a substituted content. The substituted content is prepared by a broadcaster, preferably in a manual manner. The content is selected according to selection criteria relevant to the broadcaster and which do not need to reflect the selection criteria relevant to a specific user. It is the case when a user is very interested, for example, in sport news but not in political news. Listening to the political news selected by the broadcaster is then considered by the user as annoying and unnecessary burden.

Furthermore, the substituted content is broadcasted at a time chosen by the broadcaster. The broadcast time is periodic or occasional but certainly it is not too frequent in order to prevent annoying users with repeating information that does not change over time. For example "news flashes" are transmitted every hour, while the traffic news are transmitted every quarter of an hour when traffic jams exceed a predetermined level.

SUMMARY OF THE INVENTION

It is an object of the invention to provide an enhanced method of substituting a primary content being transmitted on a primary channel with a secondary content corresponding to a content being transmitted on a secondary channel which at least partially alleviates the above.

This object is achieved according to invention in a method as stated above, characterized by substituting the secondary content in response to a highlight occurring in the content transmitted on the secondary channel, said secondary content being a summary of the content already transmitted on the secondary channel. This is especially important in the situation when, for example, a family has gathered to watch a film that is being presented on the primary channel. At the same time a football match is being transmitted on the secondary channel. Some of the family members are interested in following the content comprising the football match but at the same time they do not want to spoil the family evening by watching this content transmitted on the secondary channel in another location. Providing these family members with the substituted secondary content comprising a summary of what has happened during the football match at an occasion of an important event, such as a goal for example, is a quite reasonable compromise. As the summary of the program comprises highlights of the program the users gather in a short time the knowledge, which otherwise would need to be gathered through watching of the actual program. The primary content is only shortly disrupted allowing the family to enjoy watching the film together, and the family members interested in the football are provided with an information that allows them to have experience close to this when watching the football match live.

In an embodiment, the program being transmitted on the secondary channel corresponds to a live event. This enables the user to be up-to-date with the live events. The user could possibly record the program and watch it afterwards. However, for programs covering live events this is not so appealing, as the live-aspect of the program is lost when watched at the later time. With this embodiment the user is provided with the program summary with a slight delay and does not loose the live-experience corresponding to the event.

In another embodiment, subsequent to presenting the secondary content, the program being currently transmitted on the secondary channel is presented instead of the primary content. This allows the user to be brought up-to-date with the program on the secondary channel and also watching an exciting part of the program that follows the secondary content transmission.

In another embodiment, the user explicitly indicates when the transmission of the primary content is to be resumed. This gives the user a control when he wants to revert to watching the primary content. When for example the football match is still very exciting after the goal the user could decide to continue watching of the content provided at the secondary channel. In case the football match turns to be rather boring the user can resume watching the primary content being transmitted at the primary channel.

In another embodiment, the resumed transmission of the primary content is time-shifted by the time amount corresponding to a duration of a substituted content. This allows smooth transition between the different programs that are intertwined with each other. It allows the user to resume watching of the primary content starting from a moment the user has left the content to watch the substituted content. This allows the user to switch to the primary content without wondering what the user has missed while watching the substitute content.

In another embodiment, skipping a part of commercial break corresponding to the predetermined time amount diminishes the time-shift, said predetermined time amount corresponding to a duration of the substituted content. This allows the primary content being shown to the user to catch-up with the actual transmission of the primary content. This improves the live aspect of the user experience when watching the transmitted content. It also enables the user to efficiently use his/her time, and not to spend it on watching uninteresting e.g. commercial breaks.

In another embodiment, the duration of the substituted content is predetermined. The substituted content comprising the summary could have a different duration depending on the criteria used for summarization. To prevent too lengthy summaries the time that the user is willing to spend to be brought up-to-date with the important events can be set by the user beforehand. This limitation will result in a summary duration tailored to the user expectation.

In another embodiment, the user explicitly provides the secondary channel. This allows the user to have control over the choice of the secondary channel. If the user has to choose between the two channels on which the programs that are of interest to the user are transmitted simultaneously, the user can choose one as the primary channel and the other one as the secondary channel.

In another embodiment, the secondary channel is derived based on user preferences. If the secondary channel is not explicitly assigned, the secondary channel can be chosen based on the user preferences provided beforehand. This allows the user to be confronted only with the content which can be of interest to the user, as provided in the user preferences.

In another embodiment, the summary comprised in the secondary content is created for a content of the program being currently transmitted on the secondary channel and said content not being included in the previously transmitted summary corresponding to said program. This allows the user to be presented with only incremental updates with no duplication of the content. Or in other words it allows efficiently to spend time to give program summary updates without repeating the content already shown before.

The invention further provides a device for use in the method according to the invention.

BRIEF DESCRIPTION OF THE DRAWINGS

These and other aspects of the invention will be apparent from and elucidated with reference to the embodiments shown in the drawings, in which.

Throughout the figures, same reference numerals indicate similar or corresponding features. Some of the features indicated in the drawings are typically implemented in software, and as such represent software entities, such as software modules or objects.

DETAILED DESCRIPTION OF THE PREFERRED EMBODIMENTS

Figure 1:
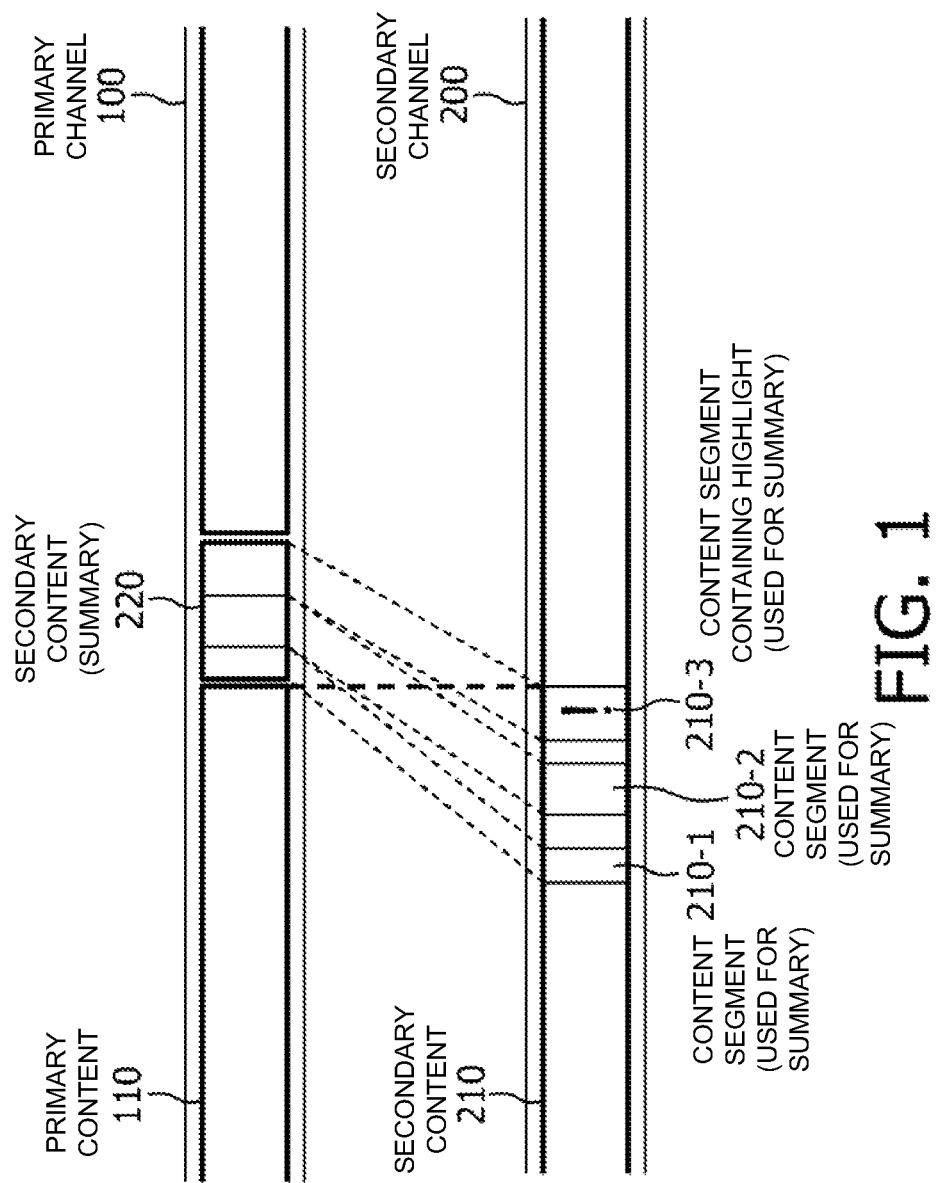
FIG. 1 illustrates a method of substituting a primary content being transmitted on a primary channel with a secondary content corresponding to a content being transmitted on a secondary channel, characterized by substituting the secondary content in response to a highlight occurring in the content transmitted on the secondary channel, said secondary content being a summary of the content until the highlight occurrence, and including said highlight.

FIG. 1 illustrates a method of substituting a primary content 110 being transmitted on a primary channel 100 with a secondary content 220 corresponding to a content being transmitted on a secondary channel 200, characterized by substituting the secondary content 220 in response to a highlight occurring in the content transmitted on the secondary channel, said secondary content 220 being a summary of the content already transmitted on the secondary channel 200.

On the primary channel 100 the primary content 110 is transmitted. On the secondary channel 200 the secondary content 210 is transmitted. When the highlight occurrence is detected in the content transmitted on the secondary channel 200, the secondary content 220 being a summary of the content already transmitted on the secondary channel 200 is used to substitute the currently transmitted primary content 110. The highlight occurs in the content segment 210-3 and is indicated by the "!" sign.

The summary comprises a selection of certain segments, namely 210-1 till 210-3, of the program 210 being currently transmitted on the secondary channel 200. Each segment is a sequence of consecutive video frames. The content of the summary comprises a segment covering the detected highlight 210-3, which has been a trigger for the secondary content substitution.

Some examples of channels are e.g. BBC4 for the primary channel 100 and BBC1 for the secondary channel 200. The primary content 110 is e.g. the movie "Jurassic Park", while the content 210 simultaneously transmitted on the secondary channel 200 is e.g. an episode of the soap opera "Eastenders".

The highlight in response to which the substitution of content is performed is for example an event concerning one of the characters (e.g. shooting of Phil Mitchell, or a quarrel between Sonia and Pauline Fowler).

Although the content discussed above refers to broadcast video, other types of content are possible. The content could also comprise audio. The programs that comprise the content are for example: music clips (songs), other forms of audio, home video, video-on-demand, movies, video clips, multimedia content, news, Internet streams, graphics, etc., or combination of such.

The content does not need per se to be provided by real-time TV broadcast. The content could be streamed from, for example, the server on the Internet or from the server of the home entertainment system.

Various methods exist that are used for the highlight detection. A few examples of them for the highlight detection used for sport events are: Alan Hanjalic, Generic approach to highlights extraction from a sport video, in IEEE International Conference on Image Processing (ICIP-2003), pages 1-4, 2003; Alan Hanjalic, Multimodal approach to measuring excitement in video, in International Conference on Multimedia and Expo, volume 2, pages 289-192, 2003; Z. Xiong, R. Radhakrishnan, A. Divakaran, and T. S. Huang, Highlights extraction from sports video based on an audio-visual marker detection framework, in International Conference on Multimedia and Expo (ICME), volume 5, 2005; or H. Pan, P. Van Beek, and M. Sezan, Detection of slow-motion replay segments in sports video for highlights generation, in International Conference on Acoustics, Speech, and Signal Processing, 3:1649-1652, 2001.

Various methods that create a summary of an arbitrary video and/or audio content are well-known. Some of these are based on: content analysis, highlight detection, blank frame detection, structure analysis, etc. An overview of such methods may be found e.g. in Cuneyt M. Taskiran, Evaluation of automatic video summarization systems, Proc. SPIE Int. Soc. Opt. Eng. 6073, 60730K (2006).

Below we give a few examples of prior art methods of for creating a summary. Muvee autoProducer www.muvee.com provides automatic summary creation from the video content. US 2002/0157095 discloses using of meta data to calculate content scores for video segments of content. Consequently importance levels for these content segments are determined from content scores. U.S. Pat. No. 5,995,095 discloses hierarchical digital video summarization based on key-frames of the video sequence. Yet another example of summary creation is disclosed in Barbieri M., Weda H., Dimitrova N., "Browsing Video Recordings Using Movie-in-a-Minute", Proc. of the IEEE International Conference on Consumer Electronics, ICCE 2006, pp. 301-302, Jan. 7-11, 2006, Las Vegas, USA.

In one of the embodiments (not shown in figures) the program being transmitted on the secondary channel corresponds to a live event. The live program is for example the coverage of: a football match, an athletic meeting, a parliament session, breaking news, or a live concert. The highlights for the football match are, for example, a goal, a penalty, a yellow card, or a red card. The highlights for breaking news could be an event that has impact for stand of the national or international affairs, e.g. death of an important political leader, a terror act, an earthquake, a volcano eruption, a tornado, etc.

The automatic highlight detection provides the user with a rather objective highlight selection, which does satisfy the interest of most of users. Alternatively, the selection of the highlights could be more subjective. This is achieved through personalization of the highlight detection. The user can provide his/her preferences concerning the topics that are of special interest to the user and are used to identify highlights. These preferences could be e.g. favorite sport disciplines, favorite football players, favorite political topics, favorite economical topics, favorite entertainment topics, favorite artists, etc. The user could additionally provide dislike-preferences that are used to dismiss some of the highlights and also prevent those highlights to be comprised in the summary.

Figure 2:
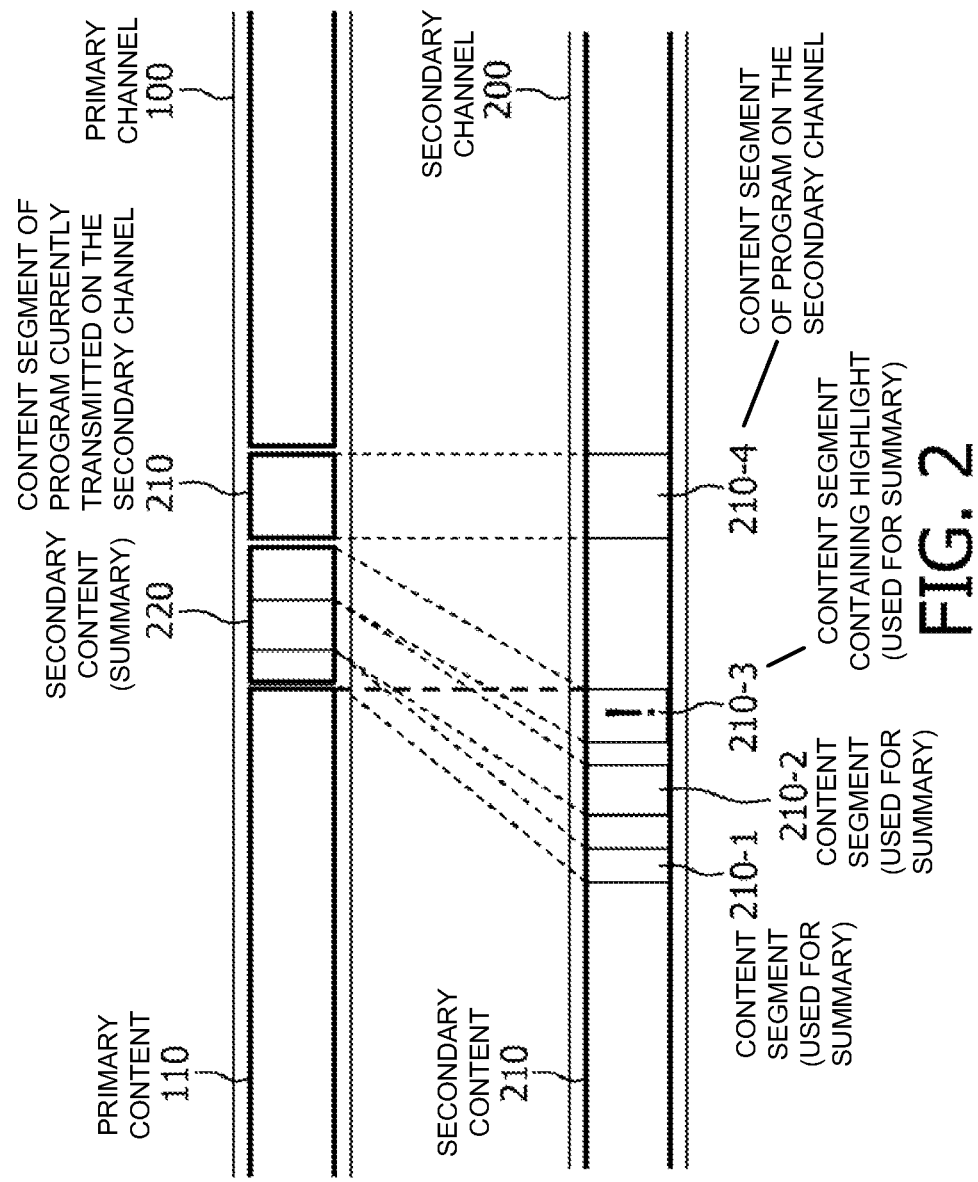
FIG. 2 shows schematically that subsequent to presenting the secondary content, the program being currently transmitted on the secondary channel is presented instead of the primary content.

FIG. 2 shows schematically that subsequent to presenting the secondary content 220, the program 210 being currently transmitted on the secondary channel 200 is presented instead of the primary content 110. In case of a football match being transmitted on the secondary channel 200, it could be a case when a goal is made just, say 5 minutes, before the end of the match. Since the last minutes could be quite exciting, especially when the result of the match is a draw, the user decides to continue watching the football match instead of immediate resuming of the primary content 110 the user has watched on the primary channel 100 before.

Alternatively, the content immediately following the detected highlight being time-shifted is presented instead of the primary content.

Alternatively, when a second highlight occurs on a channel other than the secondary channel 200 the summary of the program corresponding to this second highlight could be presented to the user. In case this second highlight occurs during the secondary content 220 corresponding to the first highlight, this secondary content 220 is transmitted to the end and only then the secondary content corresponding to the second highlight is transmitted.

The user using a dedicated button or a specific graphical user interface explicitly indicates whether he/she wants to continue watching the content following the secondary content 220 that is different from the primary content 110.

In case the substitution of the secondary content 220 is too frequent or the substituted content is too long the user can refuse the substitution and postpone it to the later time. This can be indicated through the use of a dedicated user interface, or a dedicated button.

In another embodiment (not shown in the figures) the user explicitly indicates when the transmission of the primary content 110 is to be resumed. This is done using a dedicated button or a specific graphical user interface.

Figure 3:
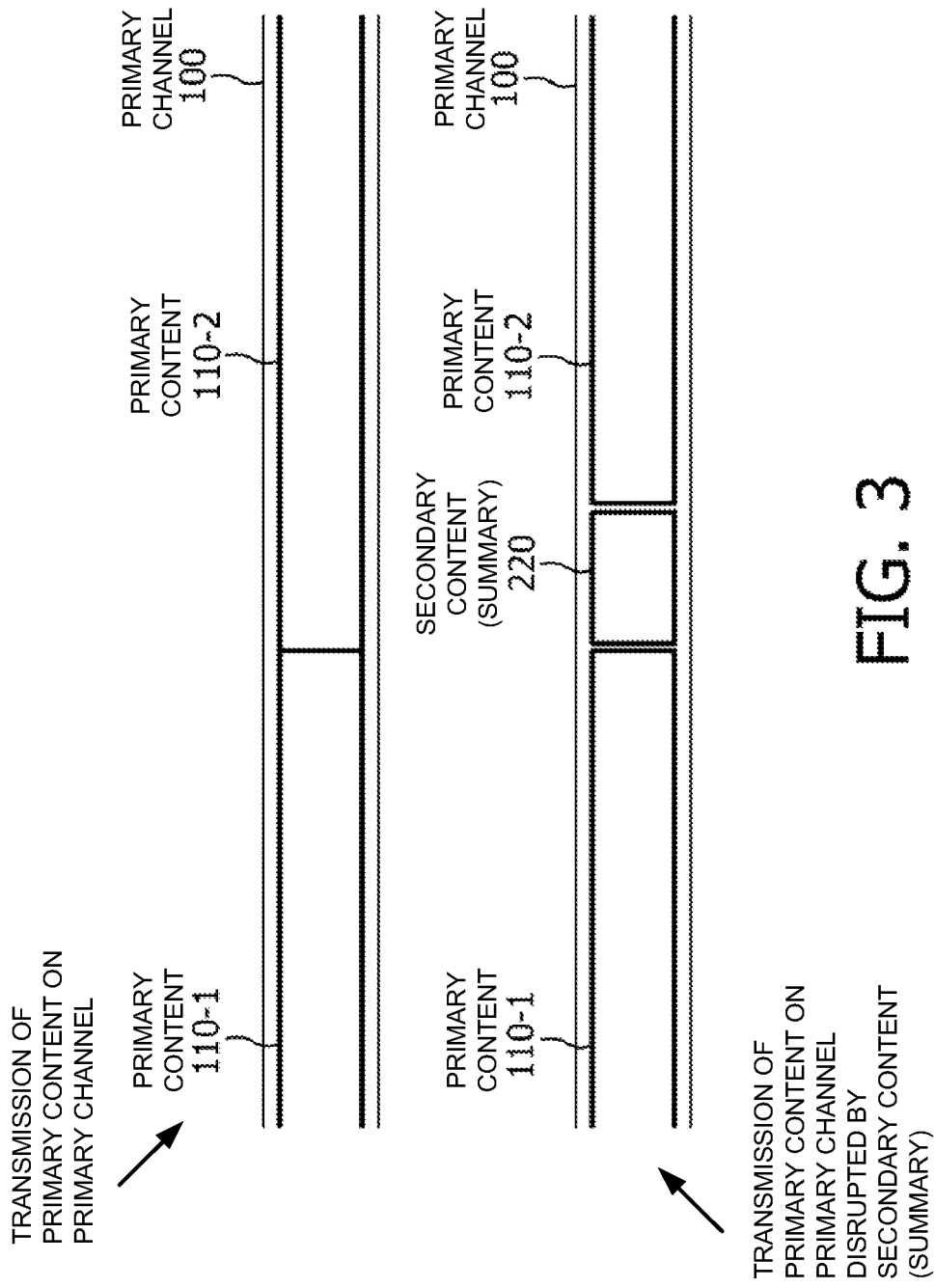
FIG. 3 shows the resumed transmission of the primary content that is time-shifted by the time amount corresponding to a duration of a substituted content.

FIG. 3 shows the resumed transmission of the primary content 110 that is time-shifted by the time amount corresponding to a duration of a substituted content. The top part of the figure shows the transmission of the primary content comprising the content 110-1 and 110-2 on the primary channel. The bottom part of the figure shows the transmission of the primary content that is disrupted by the secondary content 220. The primary content preceding the secondary content 220 corresponds to the primary content 110-1. The primary content 110 following the secondary content 220 is the primary content 110-2 shifted by the time corresponding to the duration of the substituted content 220.

To support smooth transition between the content corresponding to different programs, changing of a content context is announced to the user through e.g. an overlay logo or an overlay text, or a ticker tape. The information comprised in one of these means provides the user with e.g. a program title, a date and a time of the program emission. Providing content context switch information holds for both: changing to the secondary content 220 as well as for resuming the primary content 110. Supplying of such context switch information reduces confusing the user with the content belonging to different programs.

Alternatively, the secondary content could be displayed as a picture-in-picture. The user can then choose whether the secondary content should be displayed in the foreground or in a small picture.

Figure 4:
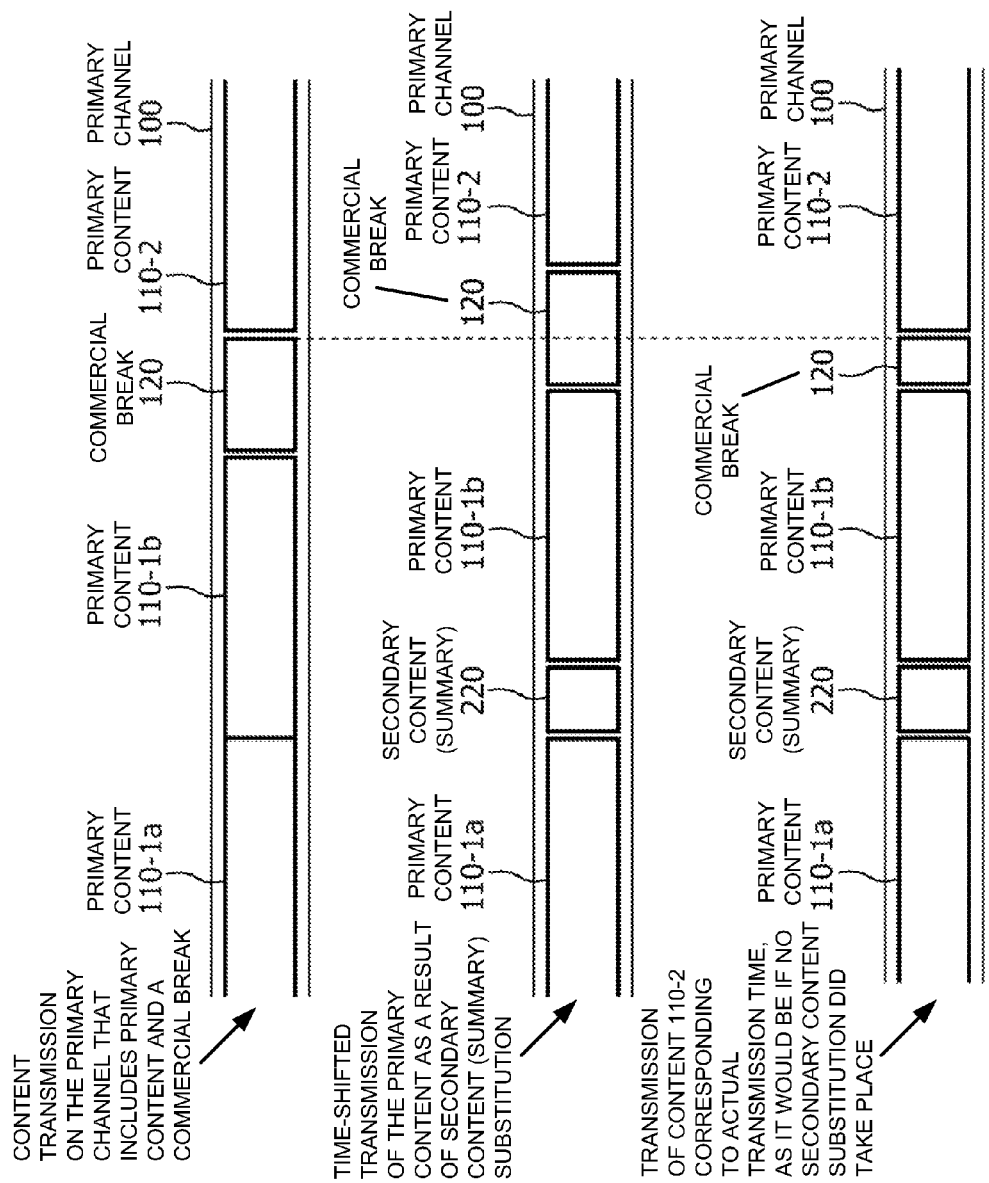
FIG. 4 illustrates skipping a part of commercial break corresponding to the predetermined time amount that diminishes the time-shift of the primary content.

FIG. 4 illustrates skipping a part of commercial break corresponding to the predetermined time amount that diminishes the time-shift of the primary content. The top part of the figure shows the content transmission on the primary channel 100 that includes transmission of the primary content 110 and the commercial break 120. The middle part of the figure shows the time-shifted transmission of the content (starting from the segment 110-1b) on the primary channel 100 as a result of the secondary content substitution. The bottom part of the figure shows the transmission of the content 110-2 corresponding to the actual transmission time, as it would be if no secondary content substitution did take place.

The content 120 in the bottom part of the figure is much shorter than the original commercial break 120 shown in the top part of the figure. The content 120 in the bottom part of the figure corresponds either to the beginning or to the end of the original commercial break. Alternatively, it could be any arbitrary segment of the commercial break, which has an appropriate duration to bridge the gap till the beginning of the transmission of the content 110-2.

In one of the embodiments (not shown in figures) the duration of the substituted content is predetermined. This gives the user a control over the allowed duration of a disruption in the primary content 110. This duration depends on the time in which the user does not loose track of the story-line of the primary content 110 or becomes disinterested in the primary content 110.

Alternatively, this constraint could take a form of an average over a period of time, e.g. the user allows in total 10 minutes of the substituted content per hour. Also the burstiness of the substituted content could be predetermined. For example the user is not allowing the substituted content to exceed 5 minutes. Also the substitution frequency of the secondary content can be constrained. For example the minimal time between the consecutive secondary contents is not smaller than 15 minutes.

In another embodiment (not shown in the figures) the user explicitly provides the program and the secondary channel 200 corresponding to it. The user explicitly assigns for example a football match and the secondary channel 200 on which the match is being transmitted beforehand.

In another embodiment the program and the secondary channel 200 corresponding to it are derived based on user preferences. The choice of the program to be monitored for highlights could be made automatically based on the users preferences. The user can beforehand provide the list of the topics (=preferences) that are interesting to the user. The Electronic Programming Guide (EPG) for example could be used to find the best match between the user preferences and the description of programs being transmitted on channels.

Alternatively, a content analysis of the transmitted programs or an analysis of meta data provided simultaneously with the transmitted programs could be used to make the selection of highlights.

Figure 5:
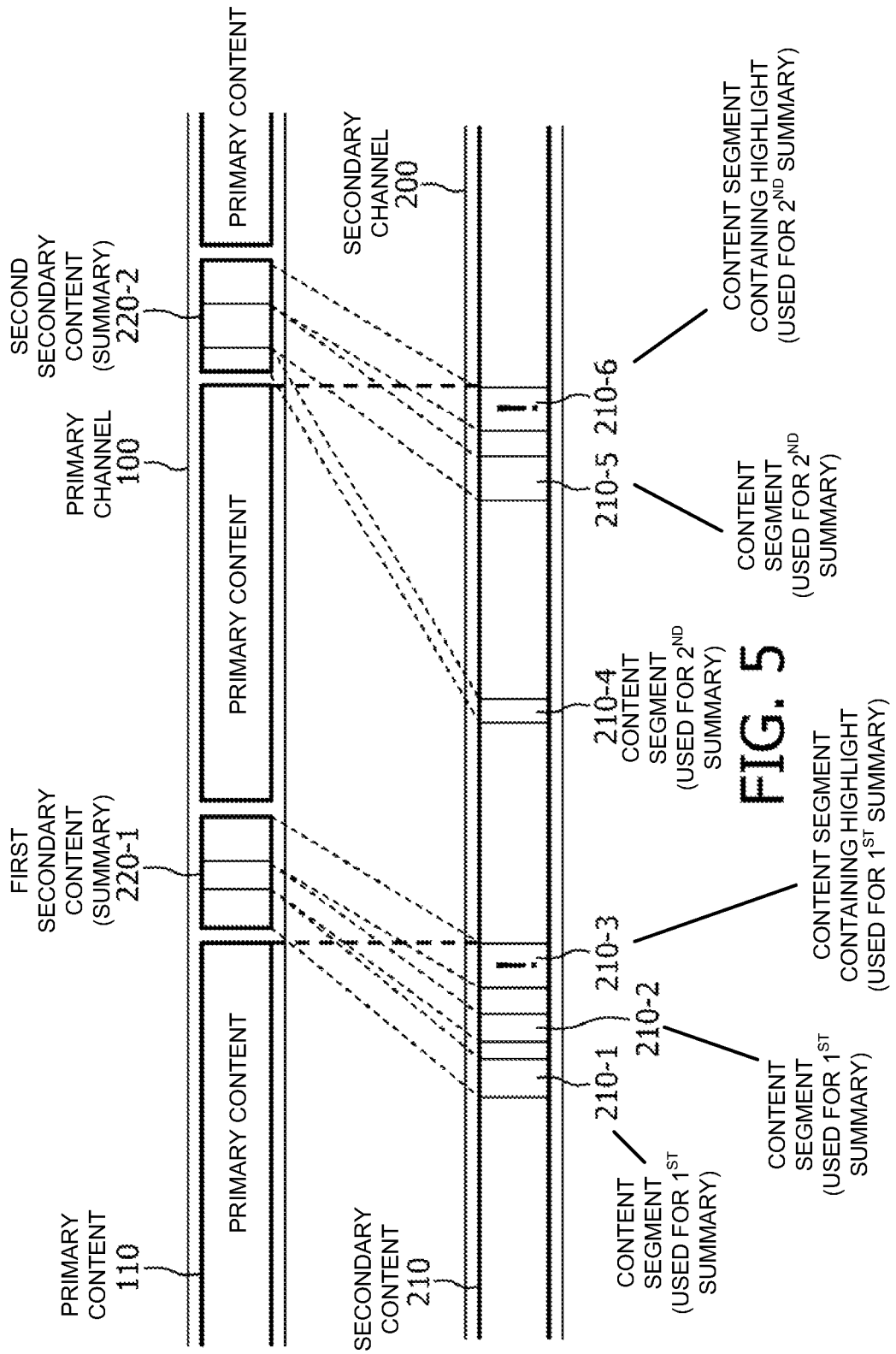
FIG. 5 shows schematically a situation where multiple items of secondary content are presented.

FIG. 5 shows schematically a situation where multiple items 220-1 and 220-2 of secondary content 220 are presented. From FIG. 5 it is apparent that the summary comprised in a second secondary content 220-2 is incremental and does not overlap with the previously presented first secondary content 220-1. The summary comprised in the secondary content 220-2 (a set of segments 210-4 till 210-6) is created for a content of the program being currently transmitted on the secondary channel 200 and said content not being included in the previously transmitted secondary content 220-1 (a set of segments 210-1 till 210-3) corresponding to said program.

Similarly, when the secondary content 220 is followed by the content corresponding to the program currently transmitted on the secondary channel 200, the secondary content 220 that is created at the later stage should not comprise the content that has been already presented to the user previously as the content aligned to the previous secondary content 220.

When the highlights occur closely to each other so that the second highlight occurs when the secondary content corresponding to the first highlight is being transmitted, the transmission of this secondary content is not disrupted by the second highlight. The secondary content corresponding to the second highlight is transmitted after the secondary content corresponding to the first highlight.

Figure 6:
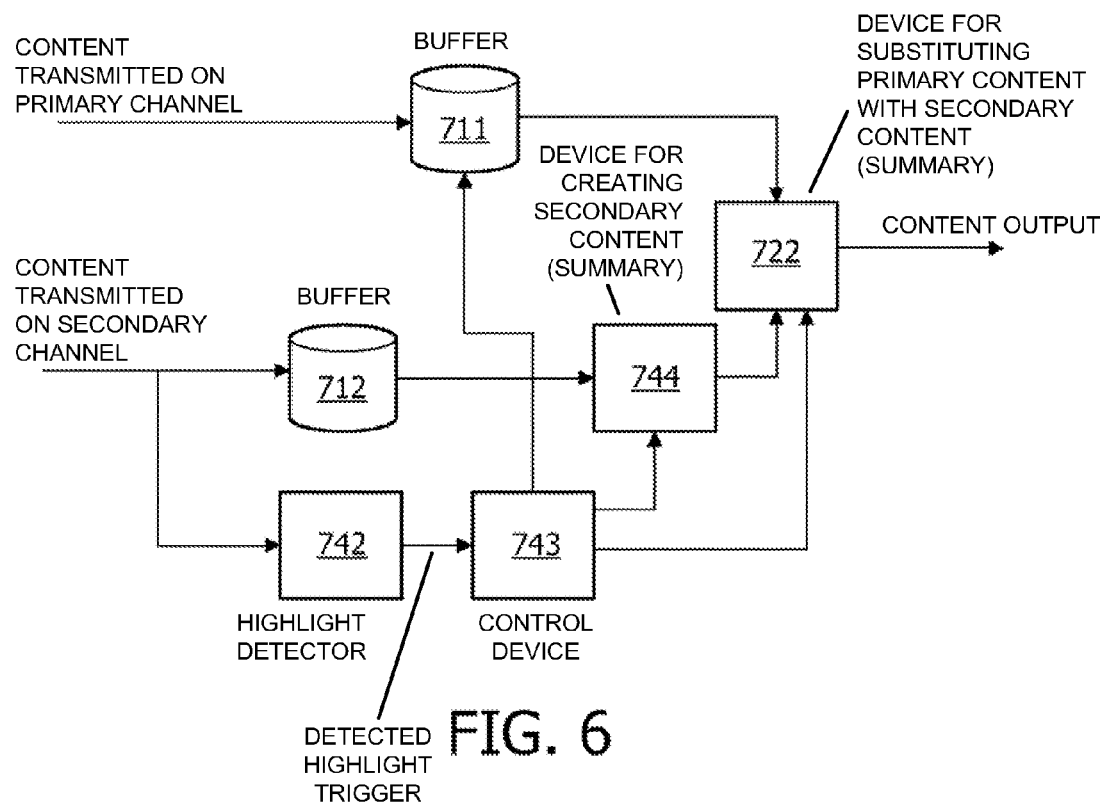
FIG. 6 shows schematically an example architecture of the device implementing the claimed method.

FIG. 6 shows schematically an example architecture of the device implementing the claimed method. The content transmitted on the primary channel 100 and on the secondary channel 200 are buffered in respective buffers 711 and 712, respectively. The content 210 is simultaneously fed into a highlight detector 742 to detect a highlight. When the highlight is detected a trigger event is communicated to a control means 743 that in turn initiates a substitution of the secondary content 220. The control means 743 instructs a means 744 for creating the secondary content being the summary to retrieve the relevant content from the buffering means 712 and to create the corresponding secondary content 220. Simultaneously, the control means 743 instructs a means 722 for substituting the primary content 110 with the secondary content 220 to retrieve the secondary content 220 from the means 744 and to forward the retrieved content further. When the secondary content 220 is finished the forwarding of the primary content 110 is resumed.

The control means 743 has also the control over forwarding of the content currently transmitted on the secondary channel and being aligned to the secondary content 220 that is already substituted. The control means 743 are also controlling timeshifting of the transmission of the primary content 110 adjusted to the substituted content termination.

When there are multiple secondary channels that provide multiple secondary contents to be transmitted in case of highlights occurrence, the branch comprising the means 712, 742, 743, and 744 is duplicated for each additional secondary channel. The control means 743 of the different branches are then synchronized with each other to prevent the disruption of the current content substitution by the new highlight.

The described architecture can be implemented in many consumer devices such as for example set-top boxes, cable modems, or home entertainment systems. The output content of the means 722 is further provided to e.g. a TV set, which presents the content to the user.

It should be noted that the above-mentioned embodiments illustrate rather than limit the invention, and those skilled in the art will be able to design many alternative embodiments without departing from the scope of the appended claims. For instance instead of video content audio content could be used.

In the accompanying claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer.

In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of substituting a primary content being transmitted on a primary channel with a substituted content corresponding to a secondary content being transmitted on a secondary channel, the method comprising:
   buffering, via a first buffer, the primary content being transmitted on the primary channel;
   buffering, via a second buffer, the secondary content being transmitted on the secondary channel;
   detecting, via a highlight detector, an occurrence of a highlight in the secondary content being transmitted on the secondary channel at a same time as the primary content being transmitted on the primary channel; and
   substituting, via a substituting device, the primary content being transmitted on the primary channel with the substituted content on the primary channel in response to a detection, via the highlight detector, of the occurrence of the highlight occurring in the secondary content being transmitted on the secondary channel at the same time as the primary content being transmitted on the primary channel, wherein the substituted content comprises a summary of the secondary content that includes a selection of program segments of the secondary content already transmitted on the secondary channel, wherein the program segments of the summary of the secondary content are selected from a set of program segments (i) occurring up until a corresponding highlight occurrence in the secondary content and (ii) including the corresponding highlight, wherein the summary of the secondary content further comprises only incremental program summary updates with no duplication of program segments of the secondary content included in a previous summary.

2. The method as claimed in claim 1, wherein the program of secondary content being transmitted on the secondary channel corresponds to a live event.

3. The method as claimed in claim 1, wherein subsequent to presenting the substituted content on the primary channel, the program of the secondary content being currently transmitted on the secondary channel is presented instead of the primary content.

4. The method as claimed in claim 3, wherein the user, via a user interface, explicitly indicates when a transmission of the primary content is to be resumed subsequent to presenting the substituted content on the primary channel.

5. The method as claimed in claim 1, wherein the resumed transmission of the primary content is time-shifted on the primary channel by a time amount corresponding to a duration of the substituted content.

6. The method as claimed in claim 5, further comprising:
skipping, via the substituting device, a part of a commercial break corresponding to a predetermined time amount occurring in the transmission of the primary content on the primary channel, wherein the skipped part diminishes the time-shift of the resumed transmission of the primary content on the primary channel, said predetermined time amount corresponding to a duration of the substituted content.

7. The method as claimed in claim 1, wherein a duration of the substituted content is a predetermined duration.

8. The method as claimed in claim 1, wherein the user explicitly specifies, via a user interface, the program of secondary content and the secondary channel corresponding to it.

9. The method as claimed in claim 1, wherein the program of secondary content and the secondary channel corresponding to it are derived based on user preferences.

10. The method as claimed in claim 1, wherein the substituted content that comprises the summary of the secondary content is created, via a device for creating the summary, for (i) a corresponding secondary content being currently transmitted on the secondary channel and (ii) said corresponding secondary content not having been included in a previously transmitted summary.

11. A device having a primary channel and a secondary channel, the device comprising:
a highlight detector for detecting highlights occurring in a secondary content transmitted on the secondary channel at a same time as primary content being transmitted on the primary channel;
a device for creating a substituted content in response to the highlight detector detecting a highlight occurrence, wherein the substituted content comprises a summary of the secondary content that includes a selection of program segments of the secondary content already transmitted on the secondary channel, wherein the program segments of the summary of the secondary content are selected from a set of program segments (i) occurring up until a corresponding highlight occurrence in the secondary content, and (ii) including said corresponding highlight, wherein the summary of the secondary content further comprises only incremental program summary updates with no duplication of program segments of the secondary content included in a previous summary; and
a device for substituting (i) the primary content being transmitted on the primary channel with (ii) the substituted content on the primary channel, wherein the substituted content is created in response to detection of the corresponding highlight occurring in the secondary content transmitted on the secondary channel at the same time as the primary content being transmitted on the primary channel.

12. The device as claimed in claim 11, further comprising:
a buffer for storing the primary content to enable a resumed transmission of the primary content to be time-shifted by a predetermined time amount, the predetermined time amount corresponding to a duration of the substituted content.

13. The device as claimed in claim 12, further wherein the device for substituting primary content with substituted content skips a part of a commercial break corresponding to said predetermined time amount occurring in the transmission of the primary content, wherein the skipped part diminishes a corresponding time-shift of the resumed transmission of the primary content.

14. A non-transitory computer-readable medium embodied with software executable on device hardware for implementing a method as claimed in claim 1.

15. A method of substituting a primary content being transmitted on a primary channel with a substituted content corresponding to a secondary content being transmitted on a secondary channel, the method comprising:
buffering, via a first buffer, the primary content being transmitted on the primary channel;
buffering, via a second buffer, the secondary content being simultaneously transmitted on the secondary channel;
detecting, via a highlight detector, an occurrence of a highlight in the secondary content being transmitted on the secondary channel at a same time as the primary content being transmitted on the primary channel;
substituting, via a substituting device, the primary content being transmitted on the primary channel with the substituted content on the primary channel in response to a detection, via the highlight detector, of the occurrence of the highlight occurring in the secondary content being transmitted on the secondary channel at the same time as the primary content being transmitted on the primary channel, wherein the substituted content comprises a summary of the secondary content that includes a selection of program segments of the secondary content already transmitted on the secondary channel, wherein the program segments of the summary of the secondary content are selected from a set of program segments (i) occurring up until a corresponding highlight occurrence in the secondary content and (ii) including the corresponding highlight, wherein the summary of the secondary content further comprises only incremental program summary updates with no duplication of program segments of the secondary content included in a previous summary; and
subsequent to substituting the substituted content on the primary channel, resuming a transmission of the primary content on the primary channel, wherein the resumed transmission of primary content on the primary channel is time-shifted to resume transmission of the primary content starting from a moment the primary content was left to transmit the substituted content on the primary channel.

* * * * *